US012063245B2

United States Patent
Willey et al.

(10) Patent No.: US 12,063,245 B2
(45) Date of Patent: Aug. 13, 2024

(54) USING THE STATE OF A REQUEST ROUTING MECHANISM TO INFORM ATTACK DETECTION AND MITIGATION

(71) Applicant: Akamai Technologies Inc., Cambridge, MA (US)

(72) Inventors: Richard E. Willey, Natick, MA (US); Ruben E. Brown, Arlington, MA (US); Daniel E. Cooper, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 67 days.

(21) Appl. No.: 16/409,517

(22) Filed: May 10, 2019

(65) Prior Publication Data

US 2020/0358814 A1    Nov. 12, 2020

(51) Int. Cl.
*H04L 9/40* (2022.01)
*H04L 67/10* (2022.01)

(52) U.S. Cl.
CPC ...... *H04L 63/1458* (2013.01); *H04L 63/1416* (2013.01); *H04L 67/10* (2013.01); *H04L 2463/144* (2013.01)

(58) Field of Classification Search
CPC . H04L 63/1458; H04L 63/1416; H04L 67/10; H04L 63/0236; H04L 2463/144; H04L 29/06; H04L 29/08; H04L 9/40; H04L 63/0263
USPC ........................................................ 726/22
See application file for complete search history.

(56) References Cited

U.S. PATENT DOCUMENTS

| | | | |
|---|---|---|---|
| 6,108,703 A | 8/2000 | Leighton et al. |
| 7,058,706 B1 | 6/2006 | Iyer et al. |
| 7,096,263 B2 | 8/2006 | Leighton et al. |
| 7,240,100 B1 | 7/2007 | Wein et al. |
| 7,251,688 B2 | 7/2007 | Leighton et al. |
| 7,260,639 B2 | 8/2007 | Afergan et al. |
| 7,274,658 B2 | 9/2007 | Bornstein et al. |
| 7,293,093 B2 | 11/2007 | Leighton et al. |
| 7,478,429 B2 | 1/2009 | Lyon et al. |

(Continued)

OTHER PUBLICATIONS

Krylov, Vladimir et al., "IP Fast Hopping Protocol Design", CEE-SECR '14, Oct. 23-25, Moscow, Russian Federation, 2014 ACM, 5 pages.

(Continued)

*Primary Examiner* — Tonia L Dollinger
*Assistant Examiner* — Mehulkumar J Shah

(57) ABSTRACT

Among other things, this document describes systems, methods and apparatus for identifying and mitigating network attacks, particularly botnet attacks and other volumetric attacks. In some embodiments, a distributed computing platform provides client-facing service endpoints and a request routing mechanism (request router or RR) directing clients to a particular service endpoint or cluster thereof to obtain a service. The state of the RR at a given time is communicated to enforcement points in the system, which may be cluster equipment, service endpoints, or other components. When client traffic arrives at a particular enforcement point it is checked for consistency with the RR's directions, referred to as 'mapping consistency'. This information is incorporated into decisions about how to handle the packets from the client.

26 Claims, 8 Drawing Sheets

(56) References Cited

U.S. PATENT DOCUMENTS

| | | | |
|---|---|---|---|
| 7,484,002 | B2 | 1/2009 | Swildens et al. |
| 7,523,181 | B2 | 4/2009 | Swildens et al. |
| 7,574,499 | B1 | 8/2009 | Swildens et al. |
| 7,716,367 | B1 | 5/2010 | Leighton et al. |
| 7,725,602 | B2 | 5/2010 | Liu et al. |
| 7,912,978 | B2 | 3/2011 | Swildens et al. |
| 7,925,713 | B1 | 4/2011 | Day et al. |
| 7,996,531 | B1 | 8/2011 | Freedman |
| 8,156,556 | B2 | 4/2012 | Krishnamurthy |
| 8,195,831 | B2 | 6/2012 | Swildens et al. |
| 8,413,238 | B1 | 4/2013 | Sutton |
| 8,458,769 | B2 | 6/2013 | Summers et al. |
| 8,613,089 | B1 | 12/2013 | Holloway |
| 8,626,949 | B2* | 1/2014 | Agarwal ............. H04L 61/4511 709/227 |
| 8,646,064 | B1* | 2/2014 | Holloway ........... H04L 63/0281 726/25 |
| 8,966,622 | B2 | 2/2015 | Dickinson et al. |
| 9,467,461 | B2 | 10/2016 | Balderas |
| 9,985,984 | B1 | 5/2018 | Chavez et al. |
| 10,129,288 | B1 | 11/2018 | Xie et al. |
| 10,237,875 | B1* | 3/2019 | Romanov ............... H04L 47/32 |
| 10,348,767 | B1* | 7/2019 | Lee ..................... H04L 63/0236 |
| 11,063,961 | B1 | 7/2021 | Heydari |
| 11,082,338 | B1* | 8/2021 | Saha ....................... H04L 45/64 |
| 2002/0174362 | A1* | 11/2002 | Ullmann ................. H04L 47/29 709/224 |
| 2003/0035370 | A1* | 2/2003 | Brustoloni .............. H04L 47/12 370/229 |
| 2003/0069981 | A1 | 4/2003 | Trovato |
| 2012/0030341 | A1* | 2/2012 | Jensen ................ H04L 67/2804 709/224 |
| 2012/0174196 | A1* | 7/2012 | Bhogavilli .......... H04L 63/0428 726/22 |
| 2016/0044054 | A1 | 2/2016 | Stiansen et al. |
| 2016/0315857 | A1 | 10/2016 | Lubashev et al. |
| 2017/0026387 | A1 | 1/2017 | Vissamsetty et al. |
| 2017/0324758 | A1* | 11/2017 | Hart .................... H04L 63/1416 |
| 2019/0207969 | A1* | 7/2019 | Brown .................. G06F 21/552 |

OTHER PUBLICATIONS

Chen, et al., "End-User Mapping: Next Generation Request Routing for Content Delivery,", SIGCOMM '15, Aug. 17-21, 2015, London, United Kingdom, 15 pages.

Cisco Systems, "Unicast Reverse Path Forwarding Enhancements for the Internet Service Provider—Internet Service Provider Network Edge", Whitepaper, 2005, 19 pages.

Ferguson, et al., "IETF, RFC 2827, Network Ingress Filtering: Defeating Denial of Service Attacks which employ IP Source Address Spoofing", May 2000, 10 pages.

Invernizzi, "Detecting the Stealthy Distribution of Malicious and Abusive Content Online, Sep. 2015, 24 pages.", Univ California, Santa Barbara Phd disseration, downloaded Dec. 20, 2018 from https://search.proquest.com/openview/81ae62c8cde161dea081e9564886aa81/1?pq-origsite=gscholar&cbl=18750&diss=y.

Jung, et al., "Flash Crowds and Denial of Service Attacks: Characterization and Implications for CDNs and Web Sites, 12 pages.", WWW2002, dated May 7-11, 2002, downloaded Dec. 20, 2018 from http://citeseerx.ist.psu.edu/viewdoc/download?doi=10.1.1.134.2862&rep=rep1&type=pdf.

Krylov, "DDoS Attack and Interception Resistance IP Fast Hopping Based Protocol", ArXiv.org, Mar. 2014, https://arxiv.org/ftp/arxiv/papers/1403/1403.7371.pdf.

Krylov, et al., "IP Fast Hopping Protocol Design, 14 pages.", presentation for 2014-CEE-SEC(R), downloaded Jan. 10, 2019 from http://2014.secrus.org/2014/files/088_kravtsov.pdf.

Krylov, V. et al., IEEE abstract/record for "SDI defense against DDoS attacks based on IP Fast Hopping method", IEEE, 2014 International Science and Technology Conference (Modern Networking Technologies) (MoNeTeC), Oct. 2014, 3 pages.

Krylov, Valdimir et al., "IP fast hopping protocol design,", ACM page for Proceedings of the 10th Central and Eastern European Software Engineering Conference in Russia Article No. 11, Moscow, Russia—Oct. 23-25, 2014, 2 pages. Downloaded on Jan. 10, 2019.

The Akamai Blog, "Intelligent User Mapping in the Cloud, 10 pages.", dated Mar. 27, 2013, (downloaded on Dec. 21, 2018. https://blogs.akamai.com/2013/03/intelligent-user-mapping-in-the-cloud.html).

Vanderavero, Nicolas et al., "The HoneyTank : a scalable approach to collect malicious Internet traffic, 10 pages.", downloaded Dec. 20, 2018 from http://citeseerx.ist.psu.edu/viewdoc/download?doi=10.1.1.435.2646&rep=rep1&type=pdf.

Zarkower, Jonathan , "End-User Mapping Brings Users Closer to Internet Nirvana", Akamai Blog, dated Aug. 20, 2015, Downloaded on Dec. 21, 2018, 9 pages. https://blogs.akamai.com/2015/08/end-user-mapping-brings-users-closer-to-internet-nirvana.html, 9 pages.

Zheng, KE et al., "A SDN-based IP Address Hopping Method Design", Nov. 2016, Proceedings of the 2016 5th International Conference on Measurement, Instrumentation and Automation (ICMIA 2016) https://www.atlantis-press.com/proceedings/icmia-16/25864337.

International Search Report, Counterpart Application, PCT/US2020/031585 International Search Report mailed on Jul. 30, 2020, 5 pages.

International Searching Authority, Written Opinion for Counterpart Application, PCT/US2020/031585 mailed on Jul. 30, 2020, 4 pages.

Search Strategy for International Search Report, Counterpart Application, PCT/US2020/031585 International Search Report mailed on Jul. 30, 2020, 1 page.

Response to Extended European Search Report, filed Jul. 19, 2023, for EP Application 20 806671.2 (counterpart to instant application), 11 pages.

EU Application 20806671.2, counterpart to current case, ESSR mailed on Dec. 21, 2022, 9 pages.

Chen, Y. , et al., "Detecting and Preventing 1-15, IP-spoofed Distributed DoS Attacks," Jul. 31, 2008, pp. 70-81, 12 pages. International Journal of Network Security, pp. 70-81. Retrieved from the Internet: http://citeseerx.ist.psu.edu/viewdoc/download?doi-10.1.1.130.4426&rep=rep1&type=pdf.

Chiba, T. , et al., "DoS Packet Filter Using DNS Information, Advanced Information Networking and Applications," Apr. 2006, 6 pages. AINA 2006. 20th International Conference on Vienna, Austria Apr. 18-20, 2006. vol. 1, pp. 1-6.

Mahale, V. , et al., "Cuckoo Filter & Remote Firewall: A mechanism for mitigation of Distribution Denial of Service attacks," Jun. 1, 2016, pp. 1313-1317, 5 pages. Retrieved from the Internet: chrome-extension://efaidnbmnnnibpcajpcglclefindmkaj/https://www.irjet.net/archives/V3/16/IRJET-V316246.pdf.

* cited by examiner

USING THE STATE OF A REQUEST ROUTING MECHANISM TO INFORM ATTACK DETECTION AND MITIGATION

BACKGROUND

Technical Field

This application relates generally to network security and the mitigation of malicious attacks on distributed computing systems.

Brief Description of the Related Art

Many distributed computing systems provide services to clients using a request routing mechanism that routes requests from a particular client to a service endpoint in the system that can provide the desired service. The service endpoint is typically realized by a service application running on a service host. The system may provide many services, and for a given service at a given time, may have many potential service endpoints to which the client might be directed. In general, request routing mechanisms typically seek to route the client's request—in view of the state of the system at request time—so as to optimize performance for the particular client, balance load on service applications and hosts, and account for a variety of other factors.

Request routing mechanisms vary widely. A very simple request routing mechanism, for example, might direct client requests to one of several service hosts in a round robin fashion. This approach essentially assumes that each service host can provide the service that the client might be requesting (e.g., a response to an HTTP 'Get' request, or other kind of service), or that there is an ability to redirect the client if the requested service is unavailable at the service host that the client reaches.

More complex request routing mechanisms operate with multiple layers of control, each of which may be applied at different enforcement points during the routing of a request.

Assume, for example, that a distributed computing system provides many kinds of services, and that service applications that can provide a given service are flexibly deployed and activated on a set of service hosts located in various data centers (points of presence) deployed across a wide area network. In this case, the request routing operation may look like the following:

(1) The client makes a DNS request to resolve a hostname associated with the system. (Assume, for example, the client seeks an HTTP service to fetch an object for a web page available under a website hostname.)

(2) The DNS system of the distributed computing system selects and provides to the client one or more IP addresses. These IP addresses may be selected from a larger set of IP addresses where the service(s) associated with the hostname can be reached. The IP addresses are also selected such that service endpoint(s) behind the IP addresses are best suited to provide the service at the given time. This may be based on the location of the client (or the client's DNS) relative to service endpoints that can provide the service.

(3) The client sends a service request (e.g, an HTTP 'Get') to the provided IP address.

(4) The request (or more specifically, the IP packets carrying the request) is received at a cluster of service endpoints, and routed to a selected one within the cluster. To the extent the IP address points to more than one service endpoint, there may be a routing decision made within the cluster (e.g., in a router, switch, or other component) based on availability, load, and the like.

The above request routing mechanism depends on (and leverages) many different associations that provide layers of control, and that are likely dynamic. IP addresses are associated with one or more services. Services are associated with service endpoints. Service endpoints represent service applications that are deployed and active on service hosts. The request routing mechanism provides clients with destination IP addresses for them to use, based on the characteristics of the client, their request, and/or the state of the system.

This scenario is broadly descriptive of the operation of many traditional content delivery networks, or CDNs for providing website content. More information about CDNs can be found, for example, in U.S. Pat. No. 6,108,703, the contents of which are hereby incorporated by reference in their entirety.

CDNs and other kinds of distributed computing systems may be implemented and run on a multi-tenant basis. Individual website owners and web application providers (examples of the tenants) can use the system to deliver their websites and other digital assets in a performant, reliable, scalable, and secure fashion. Services for the extended enterprise can also be provided, such as accelerated delivery of traffic to and from enterprise branch offices content delivery, enterprise access acceleration, enterprise security, and otherwise, all delivered over the platform.

Note that the term 'CDN' should not be interpreted to necessarily mean a system that necessarily delivers many different websites or web applications, or other digital properties. In some cases, a company may decided to build their own CDN to deliver their own content exclusively.

Attack mitigation—particularly denial of service (DOS) attack mitigation—is an important function provided by CDNs or other kinds of distributed computing systems such as described above, both to protect customers of the system and to protect the system itself. The sheer size of CDN platforms provide a measure of defense against malicious attacks. That is, an attack against any one (or even multiple) websites or other digital properties being delivered by the system may be absorbed with little impact to the overall operation of a well-designed and deployed system. Some platforms incorporate one or more "scrubbing center" components that function to identify attack traffic (particularly DDOS traffic) and block it in a highly performant way, as in U.S. Pat. No. 7,478,429, the teachings of which are hereby incorporated by reference in their entirety. Systems may also deploy a distributed set of firewalls to mitigate attacks, as described in U.S. Pat. No. 8,458,769, the teachings of which are hereby incorporated by reference for all purposes.

Attacks against such distributed computing systems seem to be constantly changing and increasing in size. It is desirable to better identify and mitigate large-scale attack traffic hitting distributed computing systems on the Internet. It is an object of this patent document to describe systems, methods and devices to meet this need. Those skilled in the art will understand these and other improvements from the teachings hereof.

BRIEF SUMMARY

Among other things, this document describes systems, methods and apparatus for identifying and mitigating attacks, particularly botnet attacks and other volumetric attacks (e.g., DOS, DDOS). In embodiments, a distributed computing system provides client services from service endpoints that represent service applications flexibly deployed and active on service hosts. The system also includes a component, referred to as a request routing mechanism, that directs clients to a particular service endpoint to obtain a given service. The state of the requesting routing mechanism at a given time is communicated to the components in the system, such as the service endpoint and/or intermediate equipment along the path. For example, the state of the request routing mechanism might be represented (at least in part) by a 'mapping' indicating which client IP addresses are currently being directed to which cluster of service endpoints, or directed to which specific endpoint. Accordingly, the source IP address of a client's packet can be checked for consistency with the current state of the request routing mechanism's directions, a concept referred to herein as 'mapping consistency'. Such a check may occur at the cluster level, or at a specific service endpoint, or elsewhere in the request path. The point at which the check occurs is referred to herein as an 'enforcement point.' Clients not "following" the request routing system's directions can be treated as suspect, e.g., possibly part of an attack. Such network packets can be blocked, quarantined, further inspected, or otherwise treated differently than normal traffic. The information may also be provided to a client reputation scoring system.

The teachings of this patent document may be used with any kind of request routing mechanism. Moreover, the teachings hereof are completely agnostic as to how the request routing mechanism selects service endpoints for clients; any approach can be used as long as the request routing mechanism has the ability to communicate the choices outside of itself. The teachings of this document may be applied at the IP layer but they are not limited to the IP layer; in general, any system with a mechanism that directs client load and can communicate the expected behavior to the targeted service endpoints (and/or to appropriate intermediate enforcement points along the load path).

In some embodiments, an enforcement point can refrain from using the results of the aforementioned mapping consistency check (and associated respondent action) unless an in-progress attack has been declared and communicated to the enforcement point. In other embodiments, the check is always enabled and consequential.

In one non-limiting embodiment, the state of the request routing mechanism can be thought of as a mapping of clients to service endpoints or clusters thereof. The mapping represents the set of clients (e.g., by CIDR block) that the request routing mechanism is directing to each service endpoint or cluster thereof at a given time, or during a given time period. That mapping may change over time, for a variety of situational reasons such as network conditions or service host load, or otherwise. In response to a potential attack, the request routing mechanism can artificially initiate a change in the mapping, potentially in a predetermined way. The mapping change can be communicated to the enforcement points, so that they can perform the aforementioned checks to see which clients have failed to follow these changes and therefore target those packets and/or clients for attack mitigation measures.

The foregoing is a brief description of certain non-limiting aspects of the teachings hereof for purposes of illustration only; it is not a definition of the invention. The claims define the scope of protection that is sought, and are incorporated by reference into this brief summary. The claims are incorporated by reference into this section.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying components being discussed in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, MQTT, TCP/IP, and UDP, is assumed. All references to HTTP should be interpreted to include an embodiment using encryption (HTTP/S), such as when TLS secured connections are established. The term "service application" is used herein to refer to software that runs on actual or virtualized hardware to provide a service. The terms "client" and "client device" are used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language document.

Figure 1:
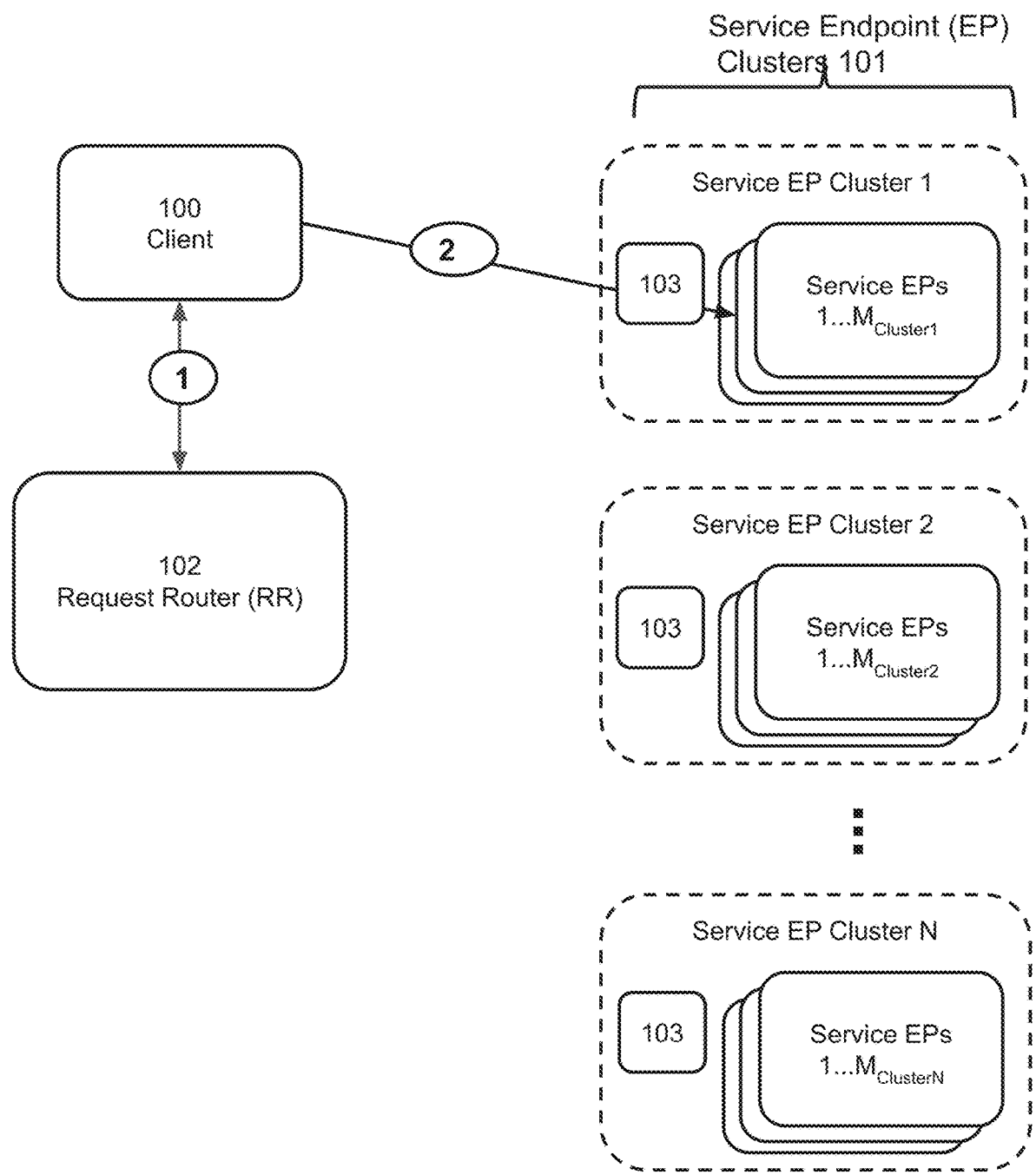
FIG. 1 is a diagram illustrating a distributed computing system according to one embodiment of the teachings hereof.

FIG. 1 illustrates the operation of a distributed computing system with request routing mechanism (request router 102, or RR, for short) and a plurality of service endpoints (service 'EPs') organized into clusters, or groups, deployed around the Internet. A service EP is provided by a service application running on a service host. Hence, for example, an HTTP service could be provided by an HTTP server application running on actual or virtualized hardware. The service hosts in FIG. 1 may be deployed at the "edge" of the Internet in end-user access networks and the like. However, this is merely an example; the service hosts could be deployed just as well in peering points, for example, or elsewhere.

The service EPs in FIG. 1 are organized into clusters 1, 2 . . . N, with each cluster having service EPs 1 . . . M. Clusters in general are referred to as service EP clusters 101 or simply clusters 101. Each cluster 101 may represent the deployment of a rack of service hosts in a particular data center in a particular network, for example, with service applications deployed thereon. Note that the number of service EPs in each cluster need not be the same.

Each cluster 101 can include an enforcement point in the form of a filter 103 that can examine incoming network packets. The filter 103 may be implemented in a local routing component (not shown explicitly) that distributes incoming network packets to individual service EPs 1 . . . M in the cluster 101. This component can be implemented by a router or switch, as known in the art. This component may distribute incoming network packets to a particular service EP based on destination IP address. If one or more service EPs share an IP address (as with a virtual IP), then the component may load balance across such service EPs or follow some other routing scheme to determine which service EP is currently handling that IP address. The filter and local routing component may be implemented as a separate physical component or within some or all of the service EPs. The cluster 101 may periodically elect a leader service EP, whose corresponding local routing component handles the cluster routing duties while it is the leader. For example, the leader service EP can receive the incoming network packets, examine them for routing, and then route them as described above on a back-end LAN.

It should also be understood that the foregoing is merely an embodiment. The teachings hereof are agnostic to how traffic is routed within a cluster. Indeed, in other embodiments, one or more of the clusters 101 in FIG. 1 may be replaced with an individual service EP, each with its own filter 103. Put another way, one or more of the "clusters" could be populated with a single service EP and the teachings hereof would still apply fully. For simplicity of description, in the description herein the term "service EP cluster" or "cluster" is used. However, the reader should assume that in any given context, the cluster 101 could in fact be a single service EP.

Request router 102 (or RR 102) is a mechanism that is known in many distributed systems, such as content delivery networks (CDNs). Generally speaking, the RR 102 directs a client 100 that is seeking certain content to a particular service EP in a cluster 101. Put another way, the client can query the RR 102, and be told to contact (step 2, FIG. 1) a particular IP address that points to a particular service EP or a set of service EPs. Client devices 100 that fail to honor this request routing, or attempt to circumvent or ignore the RR 102—by (for example) going directly to an IP address that is not the one that the RR would have provided at the time of the request—can be treated as suspicious. Moreover, it is more likely that they are part of botnet or represent another kind of attack traffic, such as a DDOS attack. This insight can be used to mitigate the attack in various ways, as will be described in more detail later in this document.

Returning to FIG. 1, in one embodiment, the RR 102 can be implemented by providing a DNS system, as known in the art. Such a request router 102 may operate as follows. At step (1) in FIG. 1, client 100 sends a DNS request for a hostname (www.example.com) associated with content of interest (such as a web page, streaming media, embedded web object, web API call, etc.) that can be served from one or more of the edge servers. It should be understood that, as known in the art, the client device 100 typically sends this DNS query to a recursive DNS server (sometimes referred to as a local DNS server) configured for it by the Internet Service Provider. The recursive DNS server in turn issues a DNS request to the RR 102 on behalf of the client 100. This conventional operation is not explicitly shown in FIG. 1, but it should be assumed to be part of step (1) when the RR 102 is a DNS mechanism.

Upon receipt of the DNS request from the recursive DNS server, the RR 102 selects an IP address that can provide the service required (for example, an HTTP service) and that points to a service EP or cluster thereof that can best handle the client's request. The determination of the "best" service EP can be based on any number of factors and the teachings hereof are entirely agnostic to the selection mechanism or the factors involved. One exemplary factor includes the location and network distance of the client device 100 relative to the clusters, as indicated by the IP address of the requesting recursive DNS servers or a portion of the IP address of the client 100 (e.g., client subnet) passed to the RR 102 by the recursive DNS server in an EDNS0 field). "Network distance" can be assessed with respect to the latency from service EPs to map points known as "core points" that are representative of client locations, see U.S. Pat. No. 7,251,688, the teachings of which are hereby incorporated by reference. Other exemplary factors include: current network conditions (e.g., congestion) between the client 100 and each edge server (or cluster 101), the current load of service EPs, the cost of running service hosts and/or bandwidth thereto, and others.

The process of determining which service EPs should service particular clients is sometimes referred to as "mapping" the clients to service EPs. In one embodiment, the mapping can be represented as a set of one or more client IP addresses that are mapped to a set of one or more service EP IP addresses. Ranges of IP addresses can be expressed using CIDR block notation, or in any other way. Because network conditions, service EP load and deployments, and other factors change over time, the mapping calculated by the RR 102 typically changes over time too.

Completing step (1) in FIG. 1, the RR 102 responds to the DNS query by sending a DNS response with the IP address (or a set of IP addresses) corresponding to the service EP that the RR 102 selected. At step (2) in FIG. 1, the client device 100 sends a content request, such as an HTTP 'Get' request, to that IP address. FIG. 1 shows that the client 100 has been directed to a particular service EP in cluster 1. However, the client 100 could at other times be directed to a service EP in cluster 2, or cluster N, or to other service EPs in cluster 1.

Figure 2:
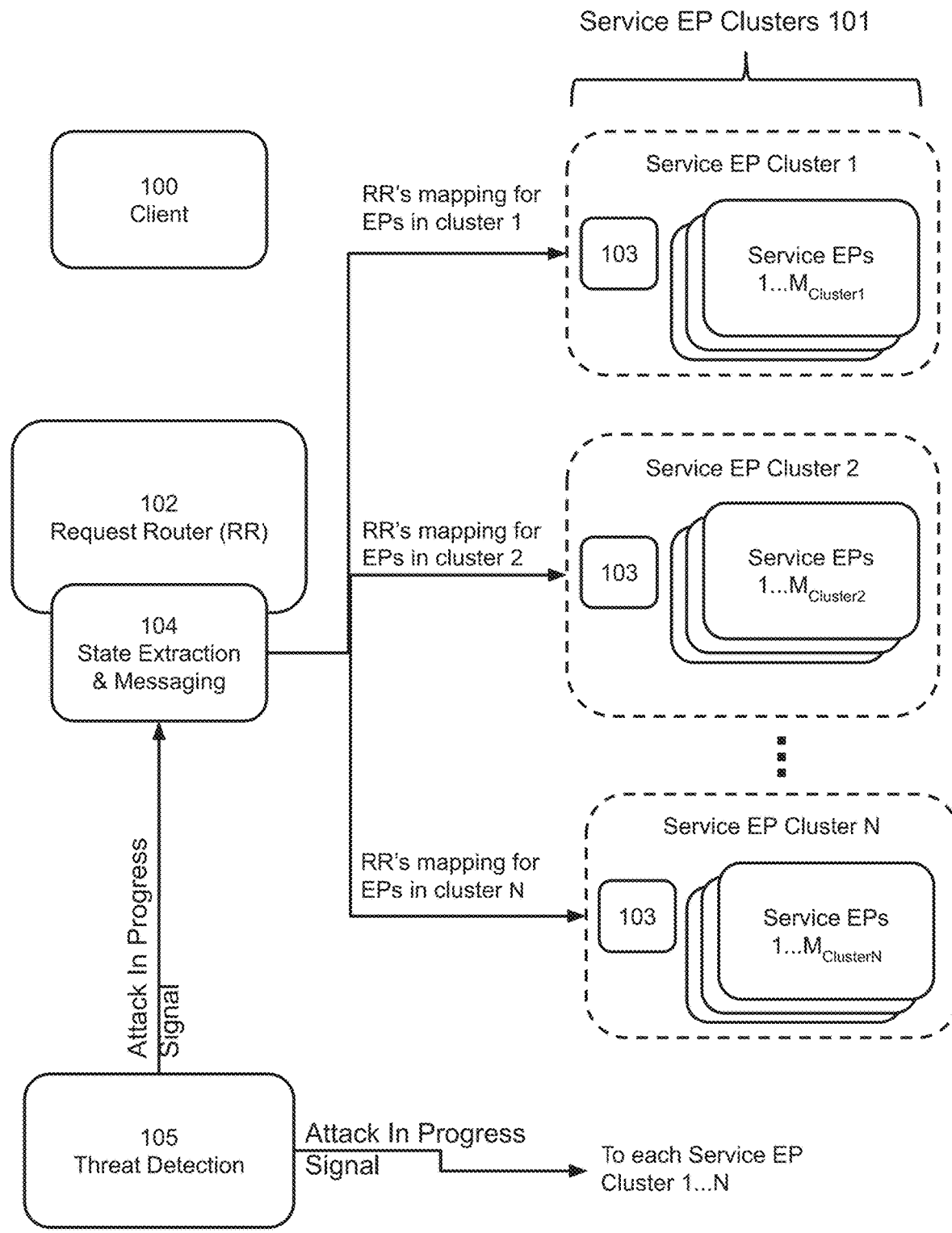
FIG. 2 is a diagram illustrating the dissemination of state information from the request router of FIG. 1, according to one embodiment of the teachings hereof.

FIG. 2 shows the dissemination of state information from the RR 102 to the service EP clusters 1 . . . N, in accordance with the teachings hereof. In this embodiment, the State Extraction and Messaging component 104, or SEM 104, is a component of the RR 102. Periodically, the SEM 104 extracts state information from the RR 102. This means that SEM 104 captures the RR 102's then-current mappings, which include the mappings, for a given service, between sets of clients and blocks of IP addresses for the service EPs in the cluster. The SEM 104 then transmits this information to the clusters 101; and more specifically, to the filters 103 in each of the clusters 101. Hence, as shown in FIG. 2, the SEM 104 sends the "RR's mapping for service EPs in cluster 1" to Cluster 1, "RR's mapping for service EPs in cluster 2" to Cluster 2, and so on.

Preferably the SEM 104 communicates to each cluster 1 . . . N only the information relevant to that cluster. For example, the filter 103 in each cluster 1 . . . N receives a set of IP addresses that are the client IP addresses that the RR 102 is currently directing to service EPs in that cluster 1 . . . N. When the RR 102 updates the mapping, the SEM 104 can repeat the extraction and the transmission to the affected clusters.

The SEM 104 may need to transform and format the state information to be suitable for export to the clusters 101. In particular, the SEM 104 may need to:

a. Translate the internal state information. For example, the RR 102 may store a mapping internally as between an IP address of a recursive DNS server and a set of IP addresses for service EPs. The SEM 103 may need to replace each IP address of a recursive DNS server with actual client IP addresses that are known or assumed to be using that recursive DNS server, because the actual clients will be sending packets (step 2 of FIG. 1) to the clusters 101, not their recursive DNS. This may not be needed if client subnetting (EDNSO) is in use and the RR 102's state information thus expresses mapping using client IP addresses.

b. De-aggregate the state information, such that the SEM 103 can send to each cluster 1 . . . N only the information relevant to the recipient cluster, e.g., generate for each cluster 1 . . . N the specific set of client IP addresses that are currently being directed to that cluster 1 . . . N, and send that set only.

c. Change the data formatting to a data format understandable by the clusters 101, if needed.

FIG. 2 includes a threat detection 105 component. The threat detection component 105 can be implemented in a security operations center that monitors traffic for volume and other characteristics to identify emerging attacks. An example of a security operations center that implements techniques to detect DDOS attacks is described in U.S. Pat. No. 7,478,429, the teachings of which are hereby incorporated by reference. The threat detection component 105 could also be implemented, at least in part, in each cluster 1 . . . N.

In some embodiments, when an attack is detected or otherwise declared to be "in progress", the threat detection component 105 sends a signal to the SEM 103 and to the clusters 101, as shown in FIG. 2. In particular, the threat detection component 105 can send the signal to the filters 103 in each cluster 1 . . . N. This signal can inform the clusters 101 to start filtering traffic based on the state information from the RR 102 that the SEM 104 sent. Also, it can inform the SEM 104 to initiate a mapping change, or series of changes, in order to facilitate attack mitigation, which operation will be described in more detail later in this document.

Figure 3:
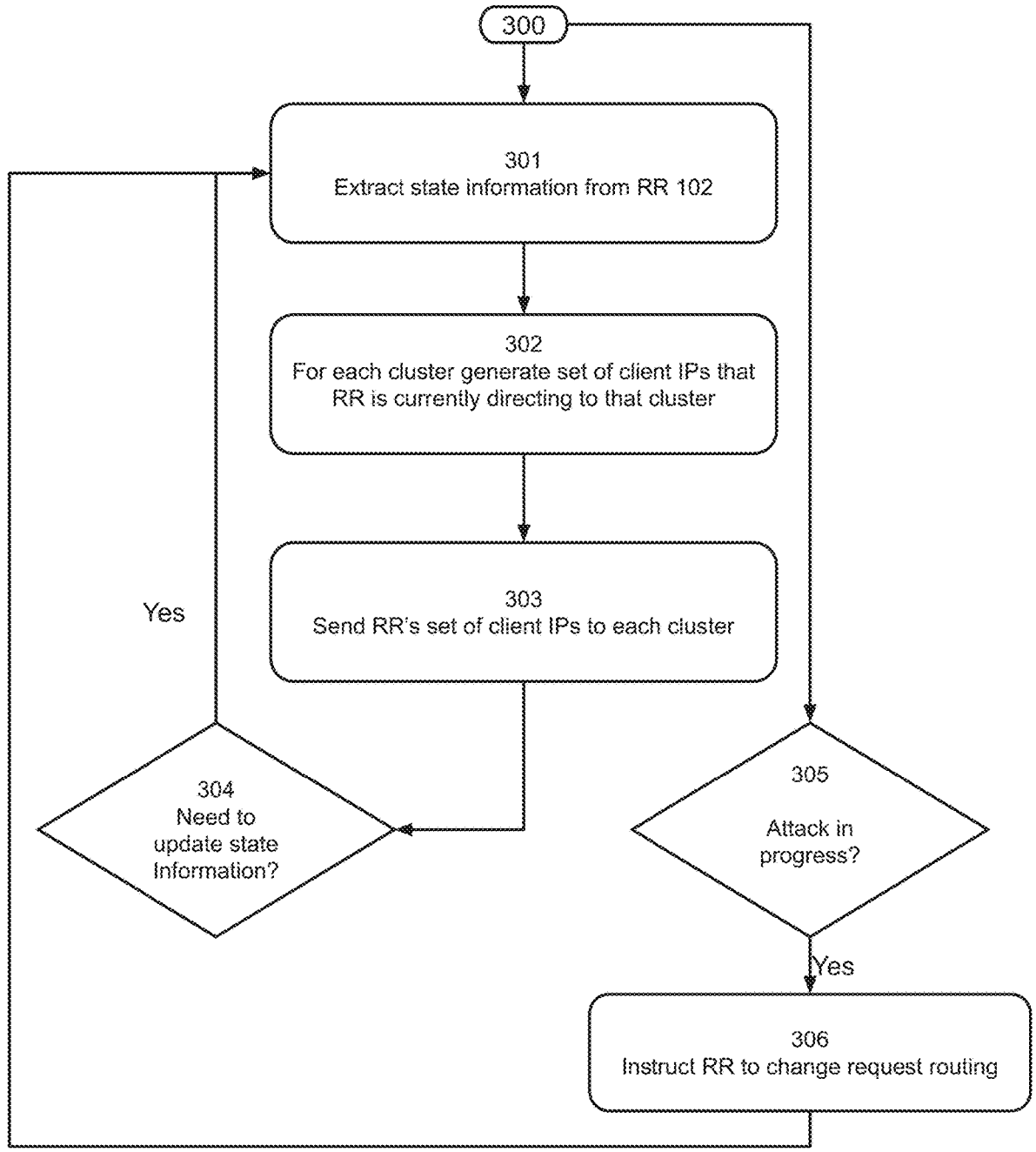
FIG. 3 is a diagram illustrating logical flow in an algorithm for the SEM 103 shown in FIGS. 1-2, according to one embodiment of the teachings hereof.

FIG. 3 is a flow diagram illustrating an example algorithm 300 that operates in the SEM 104. At 301, the SEM 104 extracts state information from the RR 102. This may be accomplished by issuing a call to a process running in the RR 102 process, or reading mapping data out of known memory locations where the RR 102 stores it.

At 302, the SEM 104 generates for each cluster 1 . . . N the specific set of client IP addresses that the RR 102 is currently directing to the respective cluster 1 . . . N. This may involve the translation, de-aggregation, and data formatting steps already mentioned above. The resultant set of client IP addresses may be expressed as one or more sets of client IP addresses mapped to a set of one or more IP addresses for clusters of service EPs.

At 303 the SEM 104 sends the applicable set of client IP addresses to each cluster 1 . . . N. The messages should be secured against tampering and eavesdropping using known techniques (e.g., mutually authenticated and encrypted communication channels, signed messages, and the like) but the use of a particular messaging technique is not required to practice the invention. The messages may be distributed using unicast, multicast, publish/subscribe messaging, or other known technologies. The set of client IP addresses may be captured in any desired application layer message and any message format, e.g., HTTP carrying JSON data, protobuf, etc.

Steps 301-303 may be re-run on a periodic basis, upon notification from the RR 102 that a change has occurred in the mapping state information, or for other reasons. Steps 301-303 may also be re-run when attack is detected. At step 304, the SEM 104 monitors for any of these conditions and re-initiates the extraction and dissemination of RR 102 state information in steps 301-303.

In some embodiments, at step 305, and in parallel to the above steps, the SEM 104 monitors for the 'attack in progress' signal from the threat intelligence component 105. If this signal is received, it leads to 306, in which the SEM 104 notifies the RR 102 of the attack signal. This notification tells the RR 102 to institute a predetermined mapping change or series of changes.

The predetermined change or series of changes can be designed such that clients 100 are rotated around to different clusters 1 . . . N. For example, assume that in time segment 1, a first set of clients is mapped to cluster 1, while a second set is mapped to cluster 2, the third set is mapped to cluster 3, and so on. In time segment 2, the mapping changed such that the first set is mapped to (for example), cluster 2, while the second set is mapped to cluster 3, and so on. This mapping change essentially represents a challenge to the client devices, i.e., clients should continue to consult the RR 102 and upon receiving the updated mapping, follow the mapping changes. Clients that do not do so will be subject to blocking or other mitigation at the clusters.

Preferably, but without limitation, each mapping change is non-overlapping (also referred to as non-colliding) compared to the one that directly preceded it. To accomplish this, the population of clients mapped to a given cluster should completely change, with no overlap of clients compared to the immediately prior time segment. Preferably, clusters that are used in such mapping changes are close enough to one another (such as in a metropolitan area) that the change in mapping does not adversely affect the performance for legitimate client devices 100. Hence, a simple example would be to divide client devices into N groups, $CD_1$, $CD_2 \ldots CD_N$ and map each group to a particular service EP cluster $C_1, C_2 \ldots C_N$ in a given geographic region such that $CD_1 \rightarrow C_1, CD_2 \rightarrow C_2 \ldots CD_N \rightarrow C_N$. Upon rotation the maps could be changed +1, such that $CD_1 \rightarrow C_2, CD_2 \rightarrow C_3 \ldots CD_N \rightarrow C_{N+1}$ with the final CD wrapping to be mapped to $C_N$.

Figure 4A:
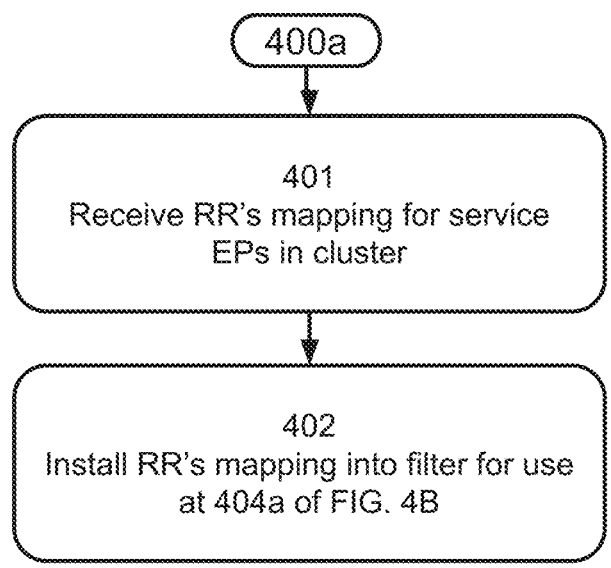
FIGS. 4A-4B are diagrams illustrating logical flow in an algorithm in the local routing component in the clusters shown in FIGS. 1-2, according to one embodiment of the teachings hereof.

FIG. 4A is a logical flow diagram illustrating one embodiment of an algorithm 400a running in the filter 103 of each cluster 1 . . . N. At 401, the SEM 104 sends and the filter 103 receives the set of client IP addresses that the RR is currently sending to the set of service EPs the given cluster. At 402, the set of client IP addresses are installed into the filter 103.

Figure 5:
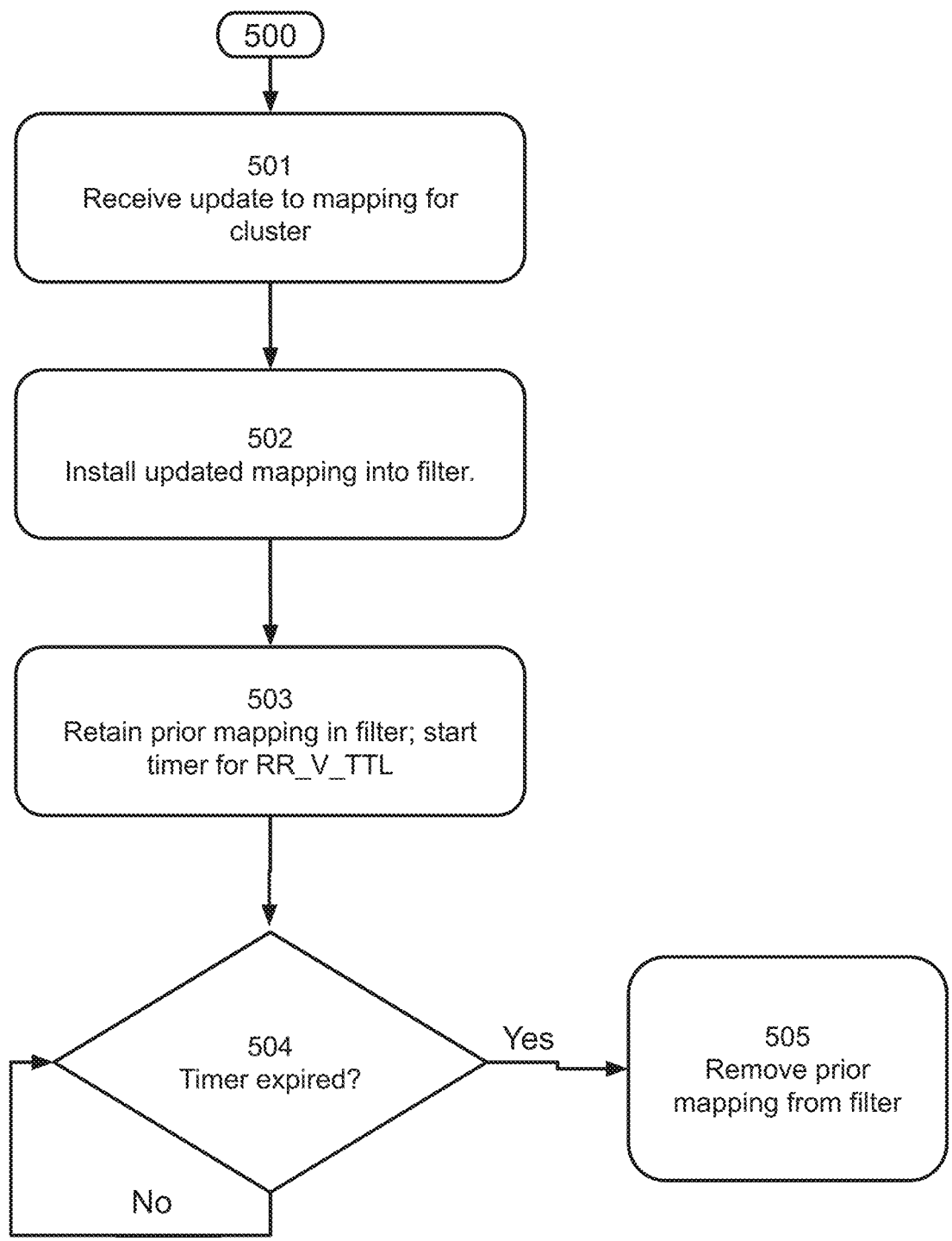
FIG. 5 is a diagram illustrating logical flow in an algorithm in the local routing component in the clusters shown in FIGS. 1-2, according to one embodiment of the teachings hereof.

Mapping updates are likewise handled via the process in FIG. 4A. From time to time, a new (updated) set of client IP addresses is received from the SEM 104, and installed in the filter 103. The most recently received information can be installed in the filter 103 upon receipt. In one embodiment, the prior information (with the "old" mapping) can be discarded immediately. In some embodiments, the mapping is received at 401 with a timestamp or other datum that indicates when it should be installed (which may be some short time away in the future). In other embodiments, the receipt of a new mapping at 401 triggers an update to the filter 103, but the prior mapping is retained and remains valid for some period of time. FIG. 5 illustrates such an update process in more detail and will be described later in this document.

Figure 4B:
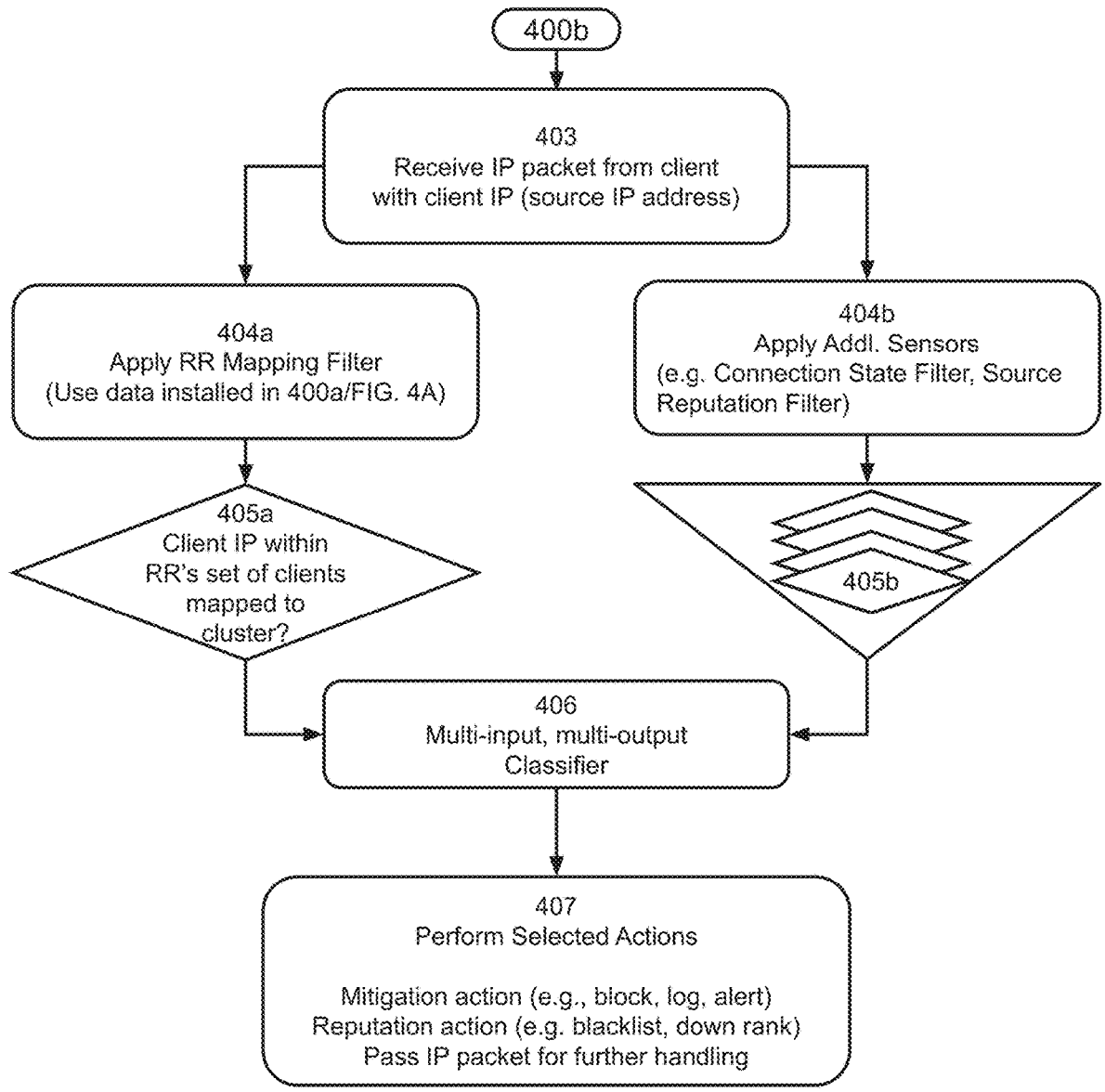

FIG. 4B illustrates an embodiment of an algorithm 400b running in the filter 103 that is related to FIG. 4A and 400a.

At 403, an IP packet is received from a client. The filter 103 applies several sensors 404a and 404b to determine how to handle the packet. In the illustrated embodiment, the application of the mapping filter at 404a is called out separately from the others, which are collected into 404b; 404a is now described.

Step 404a represents the application of a sensor (the mapping filter) to determine if the IP packet from 403 is consistent with mapping, in accord with the inventive techniques being presented in this document. The logical decision is taken at 405a. At 405a, the source IP address in the IP packet is compared to the mapping that was received from the SEM 104 and installed (per FIG. 4A). More specifically, it is determined whether the source IP address (client IP) in the packet falls within the set of IPs currently currently being mapped to the destination IP (edge server IP) in the packet. If so, this indicates mapping consistency, and accordingly the mapping filter 404a provides that signal to the classifier 406. If not, this indicates mapping inconsistency, and the mapping filter indicates such to the classifier 406. As an example of an implementation detail, the netfilter component of the Linux operating system could provide the matching capability for 405a. Any component that can examine and compare an IP address to a set of IP addresses can be used.

As shown by 404b, a wide variety of sensors other than 404a may be applied by filter 103. The number and nature of such sensors depends on the particular design goals, computing resource capabilities and limitations, overall system architecture, types of attacks against which defense is necessary, and other factors. One example of an additional sensor that can be applied at 404b is a connection state filter, which could determine whether the packet received at 403 is associated with a previously established connection (e.g. TCP connection) and may further determine the current system view of that connection (e.g., it should be allowed, it has been classified as malicious for some reason, it should be allowed but tracked, etc.). Another example of an additional sensor applied at 404b is a source reputation filter. This filter might accept, e.g., an input from a security intelligence subsystem that provides a reputation score or other indication as to whether the client is malicious (typically based on client IP address from 403). A final example of an additional sensor that can be applied at 404b is a sensor that indicates whether an attack has been declared by the system to be in progress; in other words, sensor that detects the "Attack in Progress" signal shown in FIG. 2 from 105. As mentioned earlier, the attack in progress signal may have a particularly significant effect, at least some implementations, on how to use the output of the mapping filter 404a. It may be desirable to use the results of the mapping filter 404a to block packets from a mapping-inconsistent client only when an attack is declared in progress; and to ignore mapping inconsistencies otherwise. (Note that an "attack in progress" signal could be raised for a given subset of client IPs or to a given subset of clusters.)

The blocks 405b represent the logical decisions taken by the respective sensors from 404b.

Moving to block 406, in this embodiment a multi-input multi-output classifier ingests the output of the application of each sensor from 404a-b/405a-b. Put another way, at 406 the classifier intakes an input vector comprised of elements 1 . . . N where each input element is the output of one of the sensors. This input vector is mapped to an output (or output vector) that indicates what actions to perform to handle the IP packet that was received at 403.

Importantly, the output of the mapping filter application at 405a is considered as an input to the classifier 406; in this way, mapping consistency is included as a factor in determining how to handle the IP packet. Generalizing, given a set of other inputs 405b, the determination of whether the client is acting consistently with mapping from 405a can determine or least help determine whether to apply a mitigation, such as blocking the IP packet, versus some other action, such as passing the packet without blocking.

The classifier 406 may be implemented in a wide variety of ways. A relatively straightforward implementation is a lookup table or truth table. For example:

| Consistent with mapping? (405a) | Established Connection? (405b) | Connection currently considered ok? (405b) | Attack in Progress? (405b) | Classifier Output 406 |
|---|---|---|---|---|
| Y | N | N/A | N | Pass |
| N | N | N/A | N | Log, DownRank |
| N | N | N/A | Y | Block, Blacklist |
| Y | Y | Y | N | Pass |
| N | Y | Y | N | Log |

As those skilled in the art will recognize the above is a truncated and simplified version of a lookup table for an example set of inputs and with an example set of outputs. But, it illustrates how the output of 405a for mapping consistency is incorporated to enable the system to make inferences about how best to handle the client's packet.

In various embodiments, a classifier 406 may be implemented by a decision tree, neural network, probabilistic structure such as a Bloom filter, or a Kalman filter. A classifier 406 may be based on predetermined settings/lookup values, machine learning and machine classifiers, hybrids thereof, or otherwise. Any pattern classifier that can accept an input (preferably multiple inputs, as illustrated in FIG. 4B) and map it to an output (preferably multiple outputs, as illustrated in FIG. 4B) can be used.

At 407, the filter 103 (as the enforcement point) performs the actions specified by the output of the pattern classifier at 406. In one embodiment, the filter 103 can perform one or more of:

1) A mitigation action, such as block the IP packet, log the IP packet, or generate an alert. The alert might be sent to a threat intelligence system 105 as part of a control loop, and/or elsewhere. The alert could accordingly be used to help determine whether an attack is beginning and therefore raise the aforementioned attack in progress signal. Note that the packet could also be quarantined for deep packet inspection, or passed while in parallel copying the packet for some further analysis.
2) A reputation action, such as blacklist the client IP address or down-rank its reputation in a client reputation scoring system. Such a client reputation system, using any number of techniques that are not crucial to the practice of the techniques being discussed here, can incorporate this information into its algorithms so that the client's reputation is influenced because it exhibited the 'mapping-inconsistent' behavior that was observed. (Note: one potential result of a detecting "bad" clients is for the request routing mechanism to change routing to give such clients given poorer performance, relative to other clients. Techniques of this nature are described in U.S. Pat. No. 9,467,461, the teachings of which are incorporated by reference.)
3) Pass the IP packet for further handling, e.g., by a service EP in the cluster.
4) Other action.

Depending on the nature of the action(s), the filter 103 may perform the action itself or send a signal to another component to effect the desired consequence. For example, the filter 103 may perform a reputation action by sending a signal to a client reputation component to downrank a client.

Step 407 of FIG. 4B should not be interpreted to mean that a packet is automatically deemed "good" traffic at the end of the flow. Nor does it mean that the filter 103 is only the place to apply security policy. Rather FIG. 4B focuses on the incorporation of a check for mapping consistency with other relevant checks, in accordance with the inventive teachings hereof. Along those lines, the 'further handling' after 407 may involve further security checks, e.g., at the transport or application layers, or otherwise. Further handling after 407 may also involve sending the packet on a back-end LAN to another service EP in the cluster; that service EP can then process the traffic and respond directly to the client. If the filter 103 is running on a service host that is the destination for the packet (the target service EP), the packet may simply be passed up to the local process for handling (e.g, as determined in a conventional way by the port number and/or socket, etc.). Eventually, a server application (HTTP server or otherwise) processes the packet and responds to the client.

In some embodiments (not illustrated), step 407 can involve a check to see whether the client 100 has received a bad mapping prior to taking a mitigation action like blocking the packet. For example, a "good" client may have used a recursive DNS that is located far from the client 100 itself, resulting in the RR 102 providing an IP address for a service EP in a cluster that is suboptimal (because the RR 102 assumed that the client 100 was associated with a different, closer recursive DNS). This can occur, for example, if the client uses a public DNS server and that public DNS resolver does not pass through client subnet information (sometimes referred to as client subnetting in an EDNSO field) to the RR 102. In such situations, when the client 100 attempts to use this IP address, it may appear that the client 100 is not adhering to the mapping from the RR 102. This may involve a manual investigation (based on notice from the log entries at the filter 103) to correct the RR 102's mapping and/or re-configured the client 100 to use a closer recursive DNS.

Note that the operation 405a above has been described with respect to a filter 103 that is operating on behalf of a cluster 1 . . . N which has multiple service EPs within it. Pua another way: cluster level enforcement point). A filter 103 also can be (or instead can be) implemented specifically for each service EP (service EP level enforcement point). In that case, the mapping received from the SEM 103 in FIG. 4A/400a is tailored to the recipient service EP. In effect, the filter 103 then stores a set of acceptable client IPs. Hence, the filter 103 need only examine the source IP address.

The mapping update process is now described in connection with FIG. 5.

Assume a mapping has already been installed in the filter 103. At 501, an updated mapping is received, at 502, and this new set is installed in the filter 103. At 503, the prior mapping is retained in the filter 103 for some time period, which is referred to herein as RR_V_TTL (request router values time to live). The value for RR_V_TTL can be configured in the local routing component or filter 103. Or, it can be received along with the update in 501, or using a communication channel from the SEM 104. The value of RR_V_TTL can be selected to accommodate the fact that "good" clients may contact the RR 102 for an IP address resolution and the RR 102 may subsequently change the mapping before the client actually uses the IP address to contact a service EP. This may be due to propagation delays and caching of the IP address resolution in intermediate components or the client 100 itself. The RR_V_TTL allows some time for the prior mapping to—in effect—fade out of the system.

At 504, the timer is monitored. At 505, upon expiration of the RR_V_TTL, the prior mapping is removed from the filter 103.

Figure 6:
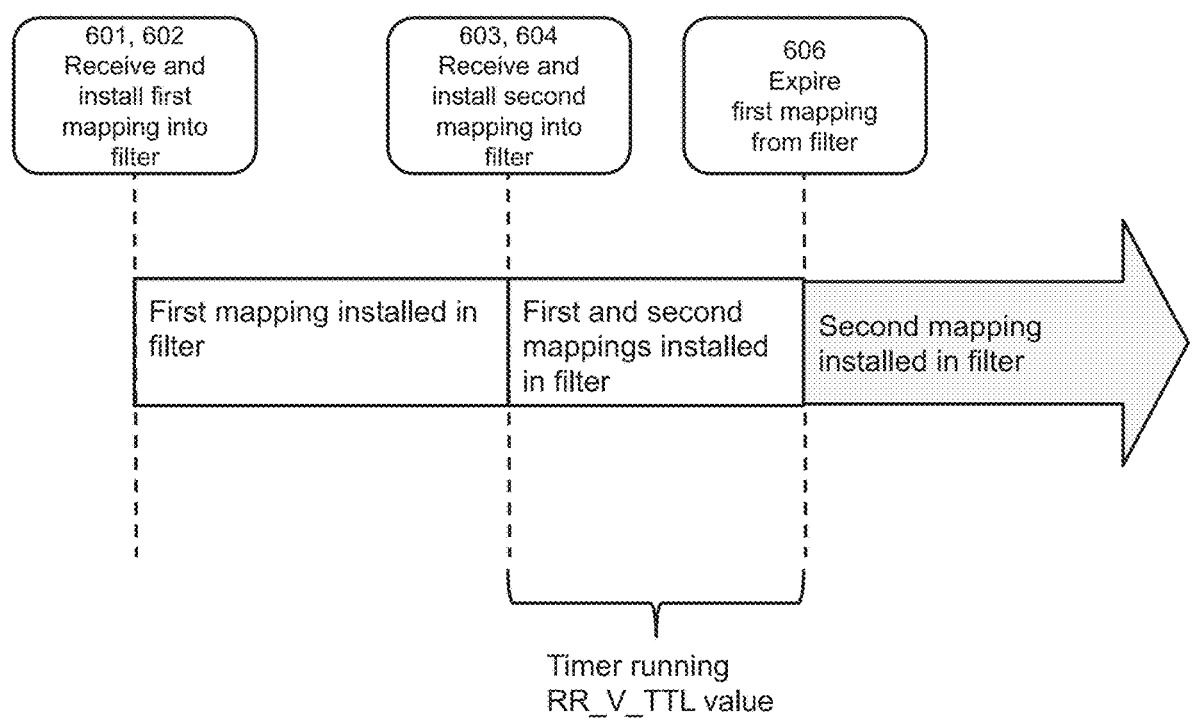
FIG. 6 is a diagram illustrating the updating of client IP addresses in the local routing component in the clusters shown in FIGS. 1-2, according to one embodiment of the teachings hereof and, FIG. 7 is a block diagram illustrating hardware in a computer system that may be used to implement the teachings hereof.

FIG. 6 is a timing diagram illustrating the effect of the RR_V_TTL and the process of updating. With reference to FIG. 6, assume that a first mapping is received and installed in the filter 103 at 601, 602. Then at 603, 604, a second (updated) mapping is received and installed. The receipt of the second set kicks off a timer that expires at the end of RR_V_TTL (606). During that time, both mappings (i.e., both sets of client and edge server IPs) are installed in the filter 103 and packets matching in either set are allowed to pass. The first mapping expires at 606 and only the second (updated) mapping remains.

Mapping to Clusters

The foregoing description has focused on an embodiment in which the RR 102 maps clients to individual service EPs in a cluster. It should be noted that, in alternative embodiments, the RR 102 can direct a client to an IP address associated with a particular cluster (e.g., cluster 1, 2 . . . N in FIGS. 1-2), and let a local routing component in the cluster decide which particular service EP in the cluster 1 . . . M should receive the packets (e.g., in accord with a load balancing algorithm). This approach is compatible with the teachings hereof. The state information and the filter simply can operate on the basis of client to cluster mappings (client IP addresses to cluster-wide IP addresses). In such a case, an additional instance of the system then can be applied within the cluster. That is: the local routing component can represent a request router distributing client traffic to individual service EPs in the cluster based on a load balancing algorithm and informing each individual service EP of that distribution. The service EPs can then have their own local enforcement point to check for consistency with the load balancing algorithm (put another way, to check that the clients are indeed following the load balancing algorithm).

State Information and Filtering at Other Networking Layers

While the teachings hereof have been described as operating primarily with respect to the IP layer, they are not limited to that approach. The mapping and filtering could occur with respect to other networking layers as defined in the OSI networking model, for example. The state information of the RR 102 must merely identify a client, or an end user, in a way that the filter of an enforcement point can recognize and compare to information found in received client packets, requests, or messages, to determine whether the RR 102 is actually directing the client (or end user) to that service EP, or service EP cluster, for that service.

For example, if the request routing associates platform IP addresses (whether virtual IP addresses or otherwise) with a particular service (e.g., HTTP over TCP), then the filter might check whether the service the client is trying to reach when sending packets to such IP address is in fact consistent therewith (this may involve accumulation and inspection of more than one packet so as to examine the transport and application layer, of course). Hence, the system could also operate at the transport layer (i.e., on TCP flows) or even the application layer, for example.

As another example, assume that in FIG. 1, the client 100 sends an authenticated DNS request to the RR 102. The RR 102 is able to identify the client (or possibly the end user) with a label other than an IP address (user-id, token, certificate, etc.). The state information extracted from the RR 102 and sent to the filters by the SEM 104 reflects a mapping of this label to a service EP. The client 100 includes this label in an authenticated packet or message sent to a service EP, whereupon the filter 103, implemented at an enforcement point at the service EP level) can extract the label from a data field and compare it to the acceptable (currently mapped) list of client labels that should be contacting that service EP, so as to determine whether to accept the packet or message.

In another example, assume that FIG. 1 is modified such that a client 100 sends network packets to the RR 102, which operates to route those packets (forwarding them) to a selected service EP. The RR 102 might, in certain embodiments, perform deep packet inspection to find a user identifier in an application layer field (or other field). The fact that this user identifier is mapped to a particular service EP can be communicated to the filter 103. Upon receipt of an application layer message, the filter 103 can then inspect the field to see if the user identifier is proper, and if not, initiate mitigation or other action.

Use in Content Delivery Networks (CDNs)

The distributed computing system with the RR 102 and the service EP clusters may be implemented within a CDN. CDN technologies, including examples of request routing mechanisms using DNS or otherwise, and related technologies are described in at least the following documents, the teachings of which are hereby incorporated by reference in their entireties: U.S. Pat. Nos. 6,108,703; 7,293,093; 7,096, 263; 7,484,002; 7,523,181; 7,574,499; 7,240,100; 7,725, 602; 7,716,367; 7,996,531; 7,925,713; 7,058,706; 7,251, 688; 7,274,658; 7,912,978; 8,195,831.

Use in Hybrid Cloud Service Hosting Environments

The distributed computing system with the RR 102 and the service EPclusters may be implemented spanning multi-service multi-vendor hybrid cloud hosting environment. Hybrid clouds may include both third party vendor and on-premise infrastructure. Centralized configuration provides consistent software defined network topologies and defined models for elastic service deployment to create the equivalent of the service EPs described above, and can define a mapping for addressable services provided by the service EPs, which in this case can be hosted (run on service hosts) in the hybrid cloud. The teachings herein may be applied to these mappings without regard to service type. Further, external to the cloud deployment these techniques apply to all traffic routed to hosted services.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
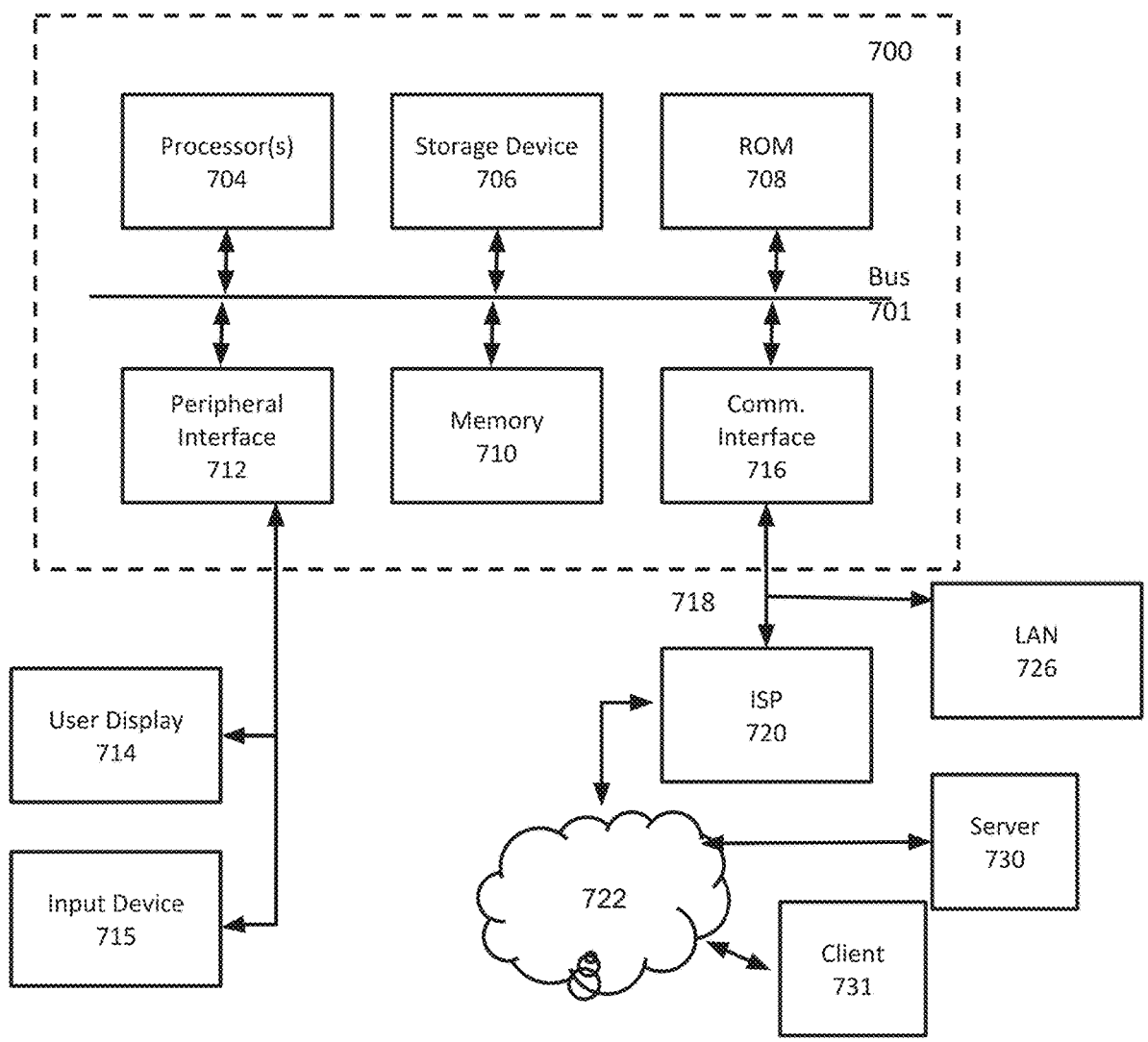

FIG. 7 is a block diagram that illustrates hardware in a computer system 700 upon which such software may run in order to implement embodiments of the invention. The computer system 700 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 700 includes a microprocessor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

A peripheral interface 712 may be provided to communicatively couple computer system 700 to a user display 714 that displays the output of software executing on the computer system, and an input device 715 (e.g., a keyboard, mouse, trackpad, touchscreen) that communicates user input and instructions to the computer system 700. However, in many embodiments, a computer system 700 may not have a user interface beyond a network port, e.g., in the case of a server in a rack. The peripheral interface 712 may include interface circuitry, control and/or level-shifting logic for local buses such as RS-485, Universal Serial Bus (USB), IEEE 1394, or other communication links.

Computer system 700 is coupled to a communication interface 716 that provides a link (e.g., at a physical layer, data link layer) between the system bus 701 and an external communication link. The communication interface 716 provides a network link 718. The communication interface 716 may represent an Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 706. Other forms of non-transitory computer-readable media include disks, tapes, magnetic media, SSD, CD-ROMs, optical media, RAM, PROM, EPROM, and EEPROM, flash memory.

Any other non-transitory computer-readable medium may be employed. Executing code may also be read from network link 718 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for mitigating attacks against a distributed computing system, the distributed computing system providing a service from any of a plurality of service endpoints addressable over one or more computer networks and a request routing mechanism that directs clients to one or more service endpoints in the plurality of service endpoints to obtain the service, the method comprising:

extracting from the request routing mechanism a mapping that identifies: (a) one or more clients and (b) a selected service endpoint in the plurality of service endpoints, from which the one or more clients should obtain the service, according to the request routing mechanism;

sending the mapping to at least one enforcement point in the distributed computing system on a network path between the one or more clients and the selected service endpoint;

subsequent to receipt of the mapping, receiving a network packet sent from a particular client to the selected service endpoint;

based on one or more characteristics of the network packet and the identification of the one or more clients in the mapping, checking whether the network packet is consistent with the mapping from the request routing mechanism, where said checking comprises checking that particular client is attempting to obtain service from a service endpoint other than the selected service endpoint in the mapping, and based at least in part on said checking:
(i) if the particular client is mapped to the selected service endpoint for obtaining the service, passing the network packet, and
(ii) if the particular client is not mapped to the selected endpoint for obtaining the service, taking an attack mitigation action against the particular client;

the request routing mechanism, in response to an in-progress attack, initiating a change in the mapping that directs the particular client to another service endpoint in the plurality of service endpoints, and thereafter the at least one enforcement point checking whether the particular client obeys the change in mapping, wherein the at least one enforcement point determines whether to take the attack mitigation action against the particular client.

2. The method of claim 1, wherein the network packet is an IP packet, and the mapping comprises a set of one or more client IP addresses and a set of one or more IP addresses associated with the selected service endpoint.

3. The method of claim 2, wherein said checking the mapping, based on one or more characteristics of the network packet, comprises comparing a source IP address of the network packet to a client IP address of the mapping, and a destination IP address in the network packet to a service endpoint IP address in the received mapping, and determining that the particular client is mapped to the selected service endpoint if both comparisons are matches.

4. The method of claim 1, wherein each of the plurality of service endpoints comprise a service application running on a service host.

5. The method of claim 1, wherein said consistency check is performed only when an in progress attack is detected.

6. The method of claim 1, wherein said change results in an updated mapping and said updated mapping is mutually exclusive with the prior mapping.

7. The method of claim 1, wherein the checking step considers the prior mapping as valid for a predetermined time period after the change.

8. The method of claim 1, further comprising performing any of a translation, de-aggregation on the extracted mapping before sending the mapping.

9. The method of claim 1, further comprising:
for the duration of an in progress attack, the request routing mechanism repeatedly changing the mapping, and upon each change, the method repeating said extracting step.

10. The method of claim 1, wherein the request routing mechanism comprises a DNS system.

11. The method of claim 1, wherein the particular client is mapped to another service endpoint, distinct from the selected service endpoint, for obtaining the service.

12. The method of claim 1, wherein the request routing mechanism generates the mapping at least in part to perform load balancing across the plurality of service endpoints.

13. The method of claim 1, wherein the attack mitigation action is selected from the group of actions that is:
blocking the network packet;
logging the network packet for further inspection;
generating an alert about the network packet; and,
sending information about the particular client and the inconsistency to a client reputation scoring system.

14. A method for mitigating attacks against a distributed computing system, the distributed computing system providing a service from any of a plurality of service endpoints addressable over one or more computer networks and a request routing mechanism that directs clients to one or more service endpoints in the plurality of service endpoints to obtain the service, the method comprising:
receiving a signal about a computer network attack;
in response to the signal, initiating a change in a mapping of one or more clients from a first service endpoint in the plurality of service endpoints to a second service endpoint in the plurality of service endpoints;
deploying the changed mapping in the request routing mechanism;
sending the changed mapping to an enforcement point in the distributed computing system on a network path between the one or more clients and the first service endpoint; and,
subsequent to deployment of the changed mapping, the enforcement point checking whether a particular client obeys the changed mapping, wherein the enforcement point determines to take an attack mitigation action against the particular client due to observing at the enforcement point the particular client attempting to reach the first service endpoint rather than the second service endpoint, in disobedience of the changed mapping.

15. A distributed computing system with mitigation against attacks, the distributed computing system providing a service from any of a plurality of service endpoints addressable over one or more computer networks, the distributed computing system comprising:
a request routing mechanism configured to:
direct clients to a selected service endpoint in the plurality of service endpoints to obtain the service,
export a mapping of one or more clients to the selected service endpoint, the mapping identifying: (a) one or more clients and (b) the selected service endpoint, from which the one or more clients should obtain the service according to the request routing mechanism; and
send the mapping to at least one enforcement point in the distributed computing system on a network path between the one or more clients and the selected service endpoint;
an enforcement point associated with the selected service endpoint configured to, subsequent to receipt of the mapping:
receive a network packet sent from a particular client to the selected service endpoint;
based on one or more characteristics of the network packet and the identification of the one or more clients in the mapping, check whether the network packet is consistent with the mapping from the request routing mechanism, where said checking comprises checking that particular client is attempting to obtain service from a service endpoint other than the selected service endpoint in the mapping, and based at least in part on said check:
(i) if the particular client is mapped to the selected service endpoint for obtaining the service, pass the network packet, and
(ii) if the particular client is not mapped to the selected service endpoint for obtaining the service, take an attack mitigation action against the particular client;
the request routing mechanism, in response to an in-progress attack, configured to initiate a change in the mapping that directs the particular client to another service endpoint in the plurality of service endpoints, the enforcement point configured to thereafter check whether the particular client obeys the change in mapping, wherein the enforcement point is configured to determine whether to take the attack mitigation action against the particular client.

16. The distributed computing system of claim 15, wherein the network packet is an IP packet, and the mapping comprises a set of one or more client IP addresses and a set of one or more IP addresses associated with the selected service endpoint.

17. The distributed computing system of claim 16, wherein said checking the mapping, based on one or more characteristics of the network packet, comprises comparing a source IP address of the network packet to a client IP address of the mapping, and a destination IP address in the network packet to a service endpoint IP address in the received mapping, and determining that the particular client is mapped to the selected service endpoint if both comparisons are matches.

18. The distributed computing system of claim 15, wherein each of the plurality of service endpoints comprise a service application running on a service host.

19. The distributed computing system of claim 15, wherein said consistency check is performed only when an in progress attack is detected.

20. The distributed computing system of claim 15, wherein said change results in an updated mapping and said updated mapping is mutually exclusive with the prior mapping.

21. The distributed computing system of claim 15, wherein the checking step considers the prior mapping as valid for a predetermined time period after the change.

22. The distributed computing system of claim 15, the request routing mechanism configured to, for the duration of an in progress attack, repeatedly changing the mapping, and upon each change, the distributed computing system repeating said extracting step.

23. The distributed computing system of claim 15, wherein the request routing mechanism comprises a DNS system.

24. The distributed computing system of claim 15, wherein the particular client is mapped to another service endpoint, distinct from the selected service endpoint, for obtaining the service.

25. The distributed computing system of claim 15, wherein the request routing mechanism generates the mapping at least in part to perform load balancing across the plurality of service endpoints.

26. The distributed computing system of claim 15, wherein the mitigation action is selected from the group of actions that is:
- blocking the network packet;
- logging the network packet for further inspection;
- generating an alert about the packet; and,
- sending information about the particular client and the inconsistency to a client reputation scoring system.

* * * * *